(12) United States Patent
Ames et al.

(10) Patent No.: US 7,238,635 B2
(45) Date of Patent: Jul. 3, 2007

(54) CREEP RESISTANT ZIRCON REFRACTORY MATERIAL USED IN A GLASS MANUFACTURING SYSTEM

(75) Inventors: Donald J. Ames, Campbell, NY (US); Ellen K. Brackman, Painted Post, NY (US); Donald L. Guile, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 242 days.

(21) Appl. No.: 10/738,425

(22) Filed: Dec. 16, 2003

(65) Prior Publication Data

US 2005/0130830 A1   Jun. 16, 2005

(51) Int. Cl.
*C04B 35/48* (2006.01)
*C04B 35/49* (2006.01)

(52) U.S. Cl. .................. 501/106; 501/103; 110/323

(58) Field of Classification Search ............... 501/103, 501/106, 104, 134, 154; 110/323
See application file for complete search history.

(56) References Cited

U.S. PATENT DOCUMENTS

| | | | | |
|---|---|---|---|---|
| 2,553,265 A | * | 5/1951 | Mochel | 501/106 |
| 2,752,259 A | * | 6/1956 | Cook | 501/107 |
| 3,216,837 A | | 11/1965 | McTaggart et al. | 106/57 |
| 3,537,834 A | * | 11/1970 | Simon | 65/199 |
| 4,152,166 A | | 5/1979 | Rogers | |
| 4,824,808 A | * | 4/1989 | Dumbaugh, Jr. | 501/66 |
| 5,124,287 A | | 6/1992 | Wehrenberg et al. | 501/106 |
| 6,121,177 A | | 9/2000 | Guigonis et al. | 501/105 |

FOREIGN PATENT DOCUMENTS

| | | |
|---|---|---|
| EP | 438 300 | 7/1991 |
| GB | 1 557 705 | 12/1979 |
| JP | 52-117912 | 10/1977 |
| JP | 03-215348 | 9/1991 |
| JP | 04-502900 | 5/1992 |
| JP | 04-280860 | 10/1992 |
| JP | 06-024839 | 2/1994 |
| WO | WO 91/03439 | 3/1991 |
| WO | WO 02/44102 | 6/2002 |
| WO | WO 2002/44102 A * | 6/2002 |

OTHER PUBLICATIONS

T.M. Wehrenberg et al., "Isostatic Pressing Large Refractory Blocks", Ceramic Bulletin, vol. 47, No. 7 (1968), pp. 642-645.

* cited by examiner

*Primary Examiner*—David Sample
(74) *Attorney, Agent, or Firm*—Christopher Nicastri

(57) ABSTRACT

A glass manufacturing system is described herein that has a forming device (e.g., isopipe) which is made from a zircon refractory material that has an improved creep resistance property. The zircon refractory material has a composition with at least the following elements: $ZrSiO_4$ (98.75–99.68 wt %); $ZrO_2$ (0.01–0.15 wt %); $TiO_2$ (0.23–0.50 wt %); and $Fe_2O_3$ (0.08–0.60 wt %).

28 Claims, 8 Drawing Sheets

CREEP RESISTANT ZIRCON REFRACTORY MATERIAL USED IN A GLASS MANUFACTURING SYSTEM

BACKGROUND OF THE INVENTION

1. Field of the Invention

The present invention relates to a zircon refractory material that can be used to make a forming vessel (isopipe) that has an improved creep resistance property and is used in a glass manufacturing system to manufacture a glass sheet.

2. Description of Related Art

Corning Inc. has developed a process known as the fusion process (e.g., downdraw process) to form high quality thin glass sheets that can be used in a variety of devices like flat panel displays. The fusion process is the preferred technique for producing glass sheets used in flat panel displays because this process produces glass sheets whose surfaces have superior flatness and smoothness compared to glass sheets produced by other methods. The fusion process is described in U.S. Pat. Nos. 3,338,696 and 3,682,609, the contents of which are incorporated herein by reference.

The fusion process makes use of a specially shaped refractory block referred to as an isopipe (e.g., forming vessel) over which molten glass flows down both sides and meets at the bottom to form a single glass sheet. Although the isopipe generally works well to form a glass sheet, the isopipe is long compared to its cross section and as such can creep or sag over time due to the load and to the high temperature associated with the fusion process. When the isopipe creeps or sags too much it becomes very difficult to control the quality and thickness of the glass sheet. One way this problem can be addressed is by modifying the elements used to make the isopipe in a way that changes its physical properties in a direction that improves its resistance to creep. This is done in the present invention.

BRIEF DESCRIPTION OF THE INVENTION

The present invention includes an isopipe (e.g., forming device) made from a zircon refractory material that has an improved creep resistance property. The zircon refractory material has a composition with at least the following elements: $ZrSiO_4$ (98.75–99.68 wt %); $ZrO_2$ (0.01–0.15 wt %); $TiO_2$ (0.23–0.50 wt %); and $Fe_2O_3$ (0.08–0.60 wt %) As described herein, two additives including a binder and a dispersant are added to batch materials (e.g., $ZrSiO_4$, $ZrO_2$, $TiO_2$ and $Fe_2O_3$) which are used to manufacture the zircon refractory material. The binder and dispersant are added as a weight % based on the inorganic batch materials as 100%. The binder added at 2.00 to 4.00% aids in the spray drying process, the granule strength and the green strength of a pressed zircon refractory body. The dispersant added at 0.06 to 0.25% aids in the wetting of the batch material powders by water to produce a fluid mix used to make the zircon refractory material. The binder and dispersant are burned out when the batch materials and in particular the pressed zircon refractory body is subjected to a sintering process to form the creep resistance zircon refractory material. The present invention also includes: (1) method for making the zircon refractory material; (2) glass manufacturing system that uses the zircon refractory material to form a glass sheet; and (3) glass sheet made using the zircon refractory material.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
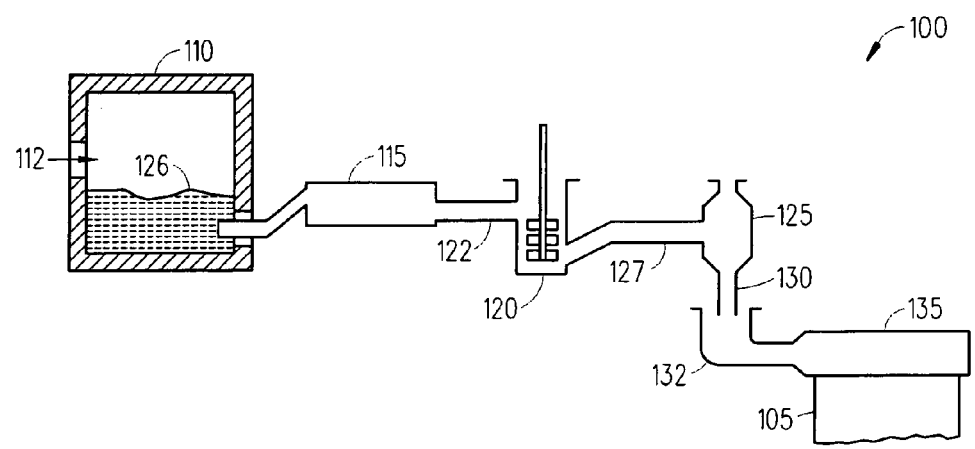
FIG. 1 is a block diagram illustrating an exemplary glass manufacturing system including an isopipe made in accordance with the present invention.

Referring to FIG. 1, there is shown a schematic view of an exemplary glass manufacturing system 100 that uses the downdraw fusion process to make a glass sheet 105. The glass manufacturing system 100 includes a melting vessel 110, a fining vessel 115, a mixing vessel 120 (e.g., stir chamber 120), a delivery vessel 125 (e.g., bowl 125) and a forming vessel 135 (e.g., isopipe 135). The melting vessel 110 is where the glass batch materials are introduced as shown by arrow 112 and melted to form molten glass 126. The fining vessel 115 (e.g., finer tube 115) receives the molten glass 126 (not shown at this point) from the melting vessel 110 and removes bubbles from the molten glass 126. The fining vessel 115 is connected to the mixing vessel 120 (e.g., stir chamber 120) by a finer to stir chamber connecting tube 122. The mixing vessel 120 is connected to the delivery vessel 125 by a stir chamber to bowl connecting tube 127. The delivery vessel 125 delivers the molten glass 126 through a downcomer 130 to an inlet 132 and into the forming vessel 135 (e.g., isopipe 135) which forms the glass sheet 105. The forming vessel 135 (e.g., isopipe 135) which is made from the zircon refractory material in accordance with the present invention is shown in greater detail below with respect to FIG. 2.

Figure 2:
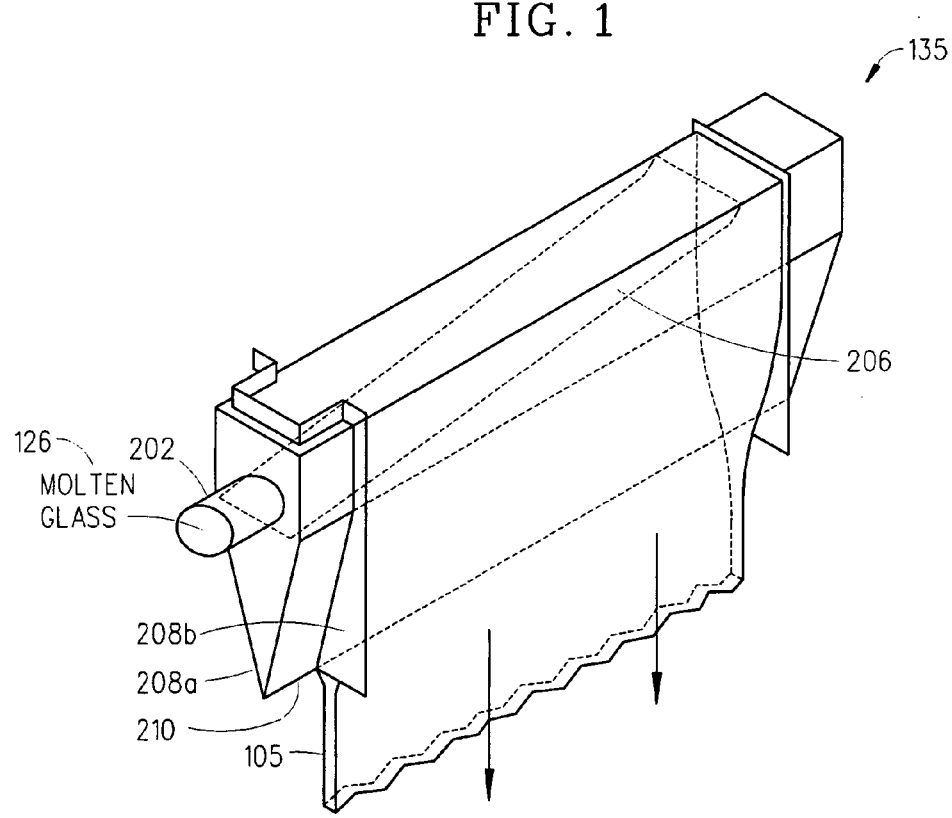
FIG. 2 is a perspective view illustrating in greater detail the isopipe used in the glass manufacturing system shown in FIG. 1.

Referring to FIG. 2, there is shown a perspective view of the isopipe 135 used in the glass manufacturing system 100. The isopipe 135 includes an opening 202 that receives the molten glass 126 which flows into a trough 206 and then overflows and runs down two sides 208a and 208b before fusing together at what is known as a root 210. The root 210 is where the two sides 208a and 208b come together and where the two overflow walls of molten glass 126 rejoin before being drawn downward and cooled to form glass sheet 105. It should be appreciated that the isopipe 135 and the glass manufacturing system 100 can have different configurations and components other that those shown in FIGS. 1 and 2 and still be considered within the scope of the present invention.

As shown in FIG. 2, the isopipe 135 is long compared to its cross section so it is important that the isopipe 135 does not creep over time due to the load and high temperature associated with the fusion process. If the isopipe 135 creeps or sags too much then it becomes difficult to control the quality and thickness of the glass sheet 105. To ensure that the isopipe 135 does not creep or sag too much it is made from batch materials including $ZrSiO_4$, $ZrO_2$, $TiO_2$ and $Fe_2O_3$ along with a binder and a dispersant both of which aid in the forming stage of the isopipe 135 (zircon refractory material) which has an improved creep resistance property when compared to the traditional isopipe. The differences between the new isopipe 135 and traditional isopipe are described in greater detail below with respect to TABLES #1, 2 and 3.

The traditional isopipe is made from a zircon refractory material having a composition as shown in TABLE #1.

TABLE #1

| Material | Total Batched (wt. %) |
| --- | --- |
| $ZrSiO_4$ (E-milled Zircon-Zirconium Silicate) | By Difference |
| $TiO_2$ (Titania) | 0.30% |
| 108BLF (Glass consisting of $SiO_2$, $Zro_2$ and $Na_2O$) | 0.30% |

The inventors of the present invention have conducted experiments and determined that an isopipe 135 can be from a zircon refractory material that has an enhanced creep resistance property when compared to the zircon refractory material used to make the traditional isopipe. TABLE #2 reports the inventive composition of zircon refractory material used to make the isopipe 135, with the $ZrSiO_4$, $ZrO_2$, $TiO_2$, $Fe_2O_3$ listed in weight percent wt %:

TABLE #2

| Material | Preferred Range | | More Preferred Range | | Most Preferred Range | |
| --- | --- | --- | --- | --- | --- | --- |
| $ZrSiO_4$* (E-milled Zircon-Zirconium Silicate) | 98.75 | 99.68 | 98.75 | 99.65 | 98.95 | 99.55 |
| $ZrO_2$ | 0.01 | 0.15 | 0.02 | 0.15 | 0.03 | 0.15 |
| $TiO_2$ | 0.23 | 0.50 | 0.23 | 0.50 | 0.30 | 0.45 |
| $Fe_2O_3$ | 0.08 | 0.60 | 0.10 | 0.60 | 0.12 | 0.45 |

*It should be noted that $ZrSiO_4$ includes a known amount of $TiO_2$ and $Fe_2O_3$ in addition to the listed $TiO_2$ (0.23–0.50 wt %) and $Fe_2O_3$ (0.08–0.60 wt %).

The zircon refractory material has a composition with at least the following elements: $ZrSiO_4$ (98.75–99.68 wt %); $ZrO_2$ (0.01–0.15 wt %); $TiO_2$ (0.23–0.50 wt %); and $Fe_2O_3$ (0.08–0.60 wt %). As described in greater detail below, two additives including a binder and a dispersant are added to those elements—batch materials $ZrSiO_4$, $ZrO_2$, $TiO_2$ and $Fe_2O_3$—which are used to manufacture the zircon refractory material. The binder and dispersant are added as a weight % based on the inorganic batch materials as 100%. The binder added at 2.00 to 4.00% aids in the spray drying process, the granule strength and the green strength of a pressed zircon refractory body. The dispersant added at 0.06 to 0.25% aids in the wetting of the batch material powders by water to produce a fluid mix used to make the zircon refractory material. The binder and dispersant are burned out when the batch materials and in particular the pressed zircon refractory body is subjected to a sintering process to form the creep resistant zircon refractory material. In the preferred embodiment, the binder is polyethylene glycol an example of which is sold under the brand name of Carbowax PEG 8000 (made by Dow Chemical Company). And, the dispersant is polyelectrolyte such as ammonium polymethacrylate and water an example of which is sold under the brand name of Darvan C (made by RT Vanderbilt Company, Inc.).

The E milled zircon is a basic refractory oxide that is frequently used in glass tank applications. As can be seen above, zircon is generally over 98.75% of the zircon refractory material. The titanium dioxide ($TiO_2$) is a strong mineralizer or densification additive that is used to increase the density and strong bonds in the zircon refractory material. The iron oxide ($Fe_2O_3$) addition is also a strong mineralizer, more so than $Tio_2$ that is added to increase the densification and bonding of the zircon refractory material. Both the $TiO_2$ and $Fe_2O_3$ increase the ion mobility and diffusion by reducing the activation energy barrier during the process of sintering (described below) the zircon refractory material. The binder (e.g., Carbowax PEG 8000) and dispersant (e.g., Darvan C) which are mixed with the batch materials are both organics that aid in the processing of the zircon refractory raw materials but are ultimately burned out during the sintering process. It is through the sintering process that the grains grow and begin to bond together to form a continuously bonded zircon refractory material. The degree of this densification and bonding determines the strength and the resistance to creep in the zircon refractory material which forms the isopipe 135. The zirconia ($ZrO_2$) does little to help densify the material. However, if there is a glassy phase in the body at elevated temperature, the zirconia reacts with the $SiO_2$ in the glassy phase to form more zircon which may improve the reaction path or densification which improves the overall microstructure of the zircon refractory material. It should be noted that $Fe_2O_3$ is not useful in many traditional glass tank applications because it can corrode and discolor the melt glass. But, this does not appear to be a problem in the current application.

TABLE #3 list exemplary zircon refractory materials that have compositions within the aforementioned inventive range and some of which could be used to make a desirable isopipe 135. Again it should be appreciated that the binder and dispersant which are part of the batch materials that make up the zircon batch are burned out when the batch materials are subjected to a sintering process to form the creep resistant zircon refractory material. TABLE #3 shows each of the compositions in parts by weight and also shows various physical properties:

TABLE #3

| Sample # | Firing | Firing shrinkage (%) | Density | Porosity (%) | Creep (3 pt flex equiv strainrate) (1/hr) (1180 C./250 psi) | Creep (3 pt flex equiv strainrate) (1/hr) (1180 C./500 psi) | Creep (3 pt flex equiv strainrate) (1/hr) (1180 C./1000 psi) | Youngs Modulus (Mpsi) | Shear Modulus (Mpsi) | Poissons Ratio | Microstructure ranking | % Fe₂O₃ | % Zr₂O₃ | % TiO₂ | % 108 BLF | % Solids | % PEG 8000 |
|---|---|---|---|---|---|---|---|---|---|---|---|---|---|---|---|---|---|
| Trad. Comp. | na | | 4.06 | 9.8 | | | | 27.083 | 10.762 | 0.258 | 0 | 0.00 | 0.00 | 0.23 | 0.30 | 80 | 4.0 |
| 21 | 1 | | 3.75 | 17.8 | | | | | | | -3 | 0.00 | 0.00 | 0.23 | 0.30 | 80 | 4.0 |
| 23 | 1 | 6.25 | 3.56/3.7 | 32.3/19.4 | | | | 17.692 | 7.242 | 0.222 | -4 | 0.30 | 0.06 | 0.23 | 0.00 | 80 | 4.0 |
| 24 | 1 | 8.75 | 4.08/4.07 | 10.1/10.5 | | | | 26.044 | 10.443 | 0.247 | -1 | 0.30 | 0.06 | 0.23 | 0.00 | 80 | 4.0 |
| 25 | 1 | 6.50 | 3.80 | 16.9 | 2.73E-07 | 4.07E-07 | 1.27E-06 | 18.501 | 7.590 | 0.219 | +1 | 0.00 | 0.06 | 0.23 | 0.00 | 80 | 4.0 |
| 26 | 1 | 9.25 | 4.00 | 10.1 | 9.02E-08 | | | 25.147 | 10.138 | 0.240 | +2 | 0.00 | 0.06 | 0.23 | 0.00 | 80 | 4.0 |
| 27A | 3 | 8.50 | 3.95 | 12.6 | 9.27E-09 | | | 24.294 | 9.784 | 0.246 | +2 | 0.30 | 0.06 | 0.23 | 0.00 | 75 | 4.0 |
| 28A | 3 | 8.00 | 4.18/3.96 | 13.7/13.2 | 2.07E-07 | 2.67E-07 | 1.39E-06 | 24.326 | 9.735 | 0.249 | -2 | 0.30 | 0.06 | 0.23 | 0.00 | 70 | 4.0 |
| 28-2 | 4 | 8.50 | 4.03 | 11.7 | 4.35E-08 | | | | | | | 0.30 | 0.06 | 0.23 | 0.00 | 70 | 4.0 |
| 29A | 3 | 5.50 | 3.76 | 18.4 | 1.74E-07 | | | 18.931 | 7.722 | 0.226 | -1 | 0.00 | 0.06 | 0.23 | 0.00 | 75 | 4.0 |
| 30A | 3 | 6.50 | 3.74 | 18.5 | | 7.84E-07 | 2.89E-06 | 18.968 | 7.723 | 0.228 | -3 | 0.00 | 0.06 | 0.23 | 0.00 | 70 | 4.0 |
| 31A | 3 | 6.50 | 3.78 | 17.3 | | | | 19.542 | 7.928 | 0.233 | -2 | 0.00 | 0.06 | 0.23 | 0.00 | 75 | 2.0 |
| 31-2 | 4 | 7.00 | 3.79 | 17.8 | 4.19E-07 | | | | | | | 0.00 | 0.06 | 0.23 | 0.00 | 75 | 3.0 |
| 32A | 3 | 6.50 | 3.79 | 17.2 | | | | 20.389 | 8.254 | 0.235 | -1 | 0.00 | 0.06 | 0.23 | 0.00 | 75 | 3.0 |
| 33A | 3 | 8.50 | 3.97 | 11.7 | | | | 25.024 | 10.026 | 0.248 | +1 | 0.30 | 0.06 | 0.23 | 0.00 | 75 | 3.0 |
| 34A | 3 | 8.50 | 4.06 | 11.4 | 1.25E-07 | | | 26.308 | 10.476 | 0.256 | +2 | 0.30 | 0.06 | 0.23 | 0.00 | 75 | 2.0 |
| 35 | 4 | 7.75 | 3.90 | 14.7 | | | | 22.824 | 9.172 | 0.244 | +1 | 0.15 | 0.06 | 0.23 | 0.00 | 75 | 3.0 |
| 35-2 | 4 | 8.00 | 3.95 | 13.9 | 2.62E-07 | | | | | | | 0.15 | 0.06 | 0.23 | 0.00 | 75 | 3.0 |
| 36 | 3 | 8.50 | 3.97 | 12.2 | 7.16E-08 | 2.13E-07 | 1.31E-06 | 25.547 | 10.189 | 0.254 | +4 | 0.30 | 0.12 | 0.23 | 0.00 | 75 | 3.0 |
| 37 | 3 | 9.00 | 4.12 | 7.5 | 1.94E-07 | 2.30E-07 | | 28.534 | 11.343 | 0.258 | +3.5 | 0.60 | 0.06 | 0.23 | 0.00 | 75 | 3.0 |
| 38 | 4 | 7.25 | 3.79 | 16.7 | | | | 20.874 | 8.466 | 0.233 | -2 | 0.00 | 0.12 | 0.23 | 0.00 | 75 | 3.0 |
| 39 | 4 | 7.25 | 3.80 | 16.2 | | 5.52E-07 | | 20.863 | 8.463 | 0.233 | -3 | 0.00 | 0.06 | 0.30 | 0.00 | 75 | 3.0 |
| 40 | 4 | 8.00 | 3.88 | 14.7 | | 4.11E-07 | | 22.867 | 9.192 | 0.244 | -2 | 0.00 | 0.00 | 0.40 | 0.00 | 75 | 3.0 |
| 41 | 4 | 6.50 | 3.69 | 19.1 | | | | 18.626 | 7.570 | 0.230 | -3 | 0.00 | 0.00 | 0.23 | 0.30 | 75 | 3.0 |
| 41-G1 | 4 | 6.25 | 3.65 | 20.2 | | | | 16.565 | 6.773 | 0.223 | -3 | 0.00 | 0.00 | 0.23 | 0.30 | 75 | 3.0 |
| 41-G2 | 4 | 5.75 | 3.66 | 20.0 | | | | 16.828 | 6.836 | 0.231 | -3 | 0.00 | 0.00 | 0.23 | 0.30 | 75 | 3.0 |
| 41-G3 | 4 | 6.00 | 3.65 | 19.9 | | | | 16.735 | 6.831 | 0.225 | -3 | 0.00 | 0.00 | 0.23 | 0.30 | 75 | 3.0 |
| 41-G4 | 4 | 5.25 | 3.62 | 21.0 | | | | 16.326 | 6.666 | 0.225 | -3 | 0.00 | 0.00 | 0.23 | 0.30 | 75 | 3.0 |
| 41-G5 | 4 | 5.50 | 3.59 | 22.0 | | | | 15.662 | 6.395 | 0.225 | -3 | 0.00 | 0.00 | 0.23 | 0.30 | 75 | 3.0 |
| 41-L | 4 | 6.80 | 3.73 | 18.5 | | | | 19.340 | 7.812 | 0.238 | -2 | 0.00 | 0.00 | 0.23 | 0.30 | 75 | 3.0 |
| 42-L | 5 | 9.40 | 4.05 | 10.9 | | | | 26.773 | 10.656 | 0.256 | +1.5 | 0.30 | 0.00 | 0.23 | 0.00 | 75 | 3.0 |
| 43-L | 5 | 8.80 | 4.09 | 10.3 | | | | 27.031 | 10.781 | 0.254 | +3 | 0.30 | 0.12 | 0.23 | 0.00 | 75 | 3.0 |
| 44 | 7 | 10.25 | 4.17 | 7.8 | | | | 28.622 | 11.385 | 0.257 | +2.5 | 0.60 | 0.12 | 0.23 | 0.00 | 75 | 3.0 |
| 45 | 7 | 10.00 | 4.19 | 6.4 | | 6.00E-07 | | 29.441 | 11.720 | 0.256 | +1 | 0.30 | 0.06 | 0.40 | 0.00 | 75 | 3.0 |
| 46 | 7 | 9.50 | 4.16 | 8.7 | | | | 28.035 | 11.197 | 0.252 | +2.5 | 0.30 | 0.12 | 0.40 | 0.00 | 75 | 3.0 |
| 47 | 7 | 10.75 | 4.22 | 3.2 | | | | 30.234 | 11.996 | 0.260 | +3 | 0.60 | 0.12 | 0.40 | 0.00 | 75 | 3.0 |

TABLE #3-continued

| Sample # | Firing | Firing shrinkage (%) | Density | Porosity (%) | Creep (3 pt flex equiv strainrate) (1/hr) (1180 C./250 psi) | Creep (3 pt flex equiv strainrate) (1/hr) (1180 C./500 psi) | Creep (3 pt flex equiv strainrate) (1/hr) (1180 C./1000 psi) | Youngs Modulus (Mpsi) | Shear Modulus (Mpsi) | Poissons Ratio | Microstructure ranking | % $Fe_2O_3$ | % $Zr_2O_3$ | % $TiO_2$ | % 108 BLF | % Solids | % PEG 8000 |
|---|---|---|---|---|---|---|---|---|---|---|---|---|---|---|---|---|---|
| 48L | 7 |  | 4.27 | 0.4 |  |  |  | 24.289 | 9.765 | 0.244 | +3.5 | 0.60 | 0.06 | 0.40 | 0.00 | 75 | 3.0 |
| 35A | 7 | 8.00 | 3.96 | 12.8 |  | 5.36E-07 |  | 30.096 | 11.951 | 0.259 | +3 | 0.15 | 0.06 | 0.23 | 0.00 | 75 | 3.0 |
| 37A | 7 | 9.50 | 4.24 | 4.4 |  |  |  | 22.973 | 9.271 | 0.239 | +4.5 | 0.60 | 0.06 | 0.23 | 0.00 | 75 | 3.0 |
| 40A | 7 | 7.25 | 3.91 | 14.2 |  |  |  | 26.172 | 10.472 | 0.250 | −1 | 0.00 | 0.06 | 0.40 | 0.00 | 75 | 3.0 |
| 43A | 7 | 8.25 | 4.06 | 10.6 |  |  |  | 25.958 | 10.428 | 0.254 | +2 | 0.30 | 0.12 | 0.23 | 0.00 | 75 | 3.0 |
| 49 | 7 | 8.00 | 4.03 | 11.1 |  |  |  | 25.266 | 11.135 | 0.246 | +1 | 0.08 | 0.03 | 0.40 | 0.00 | 75 | 3.0 |
| 50 | 7 | 8.25 | 3.99 | 12.1 |  |  |  | 26.767 | 10.705 | 0.250 | +1 | 0.08 | 0.06 | 0.40 | 0.00 | 75 | 3.0 |
| 51 | 7 | 8.25 | 4.08 | 9.4 |  | 5.06E-07 |  | 27.127 | 10.785 | 0.258 | +2.5 | 0.15 | 0.06 | 0.40 | 0.00 | 75 | 3.0 |
| 52 | 7 | 8.25 | 4.08 | 9.2 |  | 4.77E-07 |  | 28.492 | 11.313 | 0.259 | +3.5 | 0.15 | 0.12 | 0.40 | 0.00 | 75 | 3.0 |
| 53 | 7 | 9.50 | 4.17 | 6.9 |  | 6.17E-07 |  | 26.093 | 11.450 | 0.248 | +2.5 | 0.30 | 0.03 | 0.40 | 0.00 | 75 | 3.0 |
| 56 | 7 | 8.50 | 4.07 | 9.9 |  | 6.47E-07 |  |  |  |  | +1 | 0.30 | 0.12 | 0.23 | 0.00 | 75 | 3.0 |

In addition to the exemplary zircon refractory materials listed in TABLE #3, it should be understood that there are other compositions and other types of binders and dispersants not listed in TABLE #3 which have yet to be sampled and tested but could be used to make a desirable zircon refractory material (e.g., isopipe 135).

Figure 3:
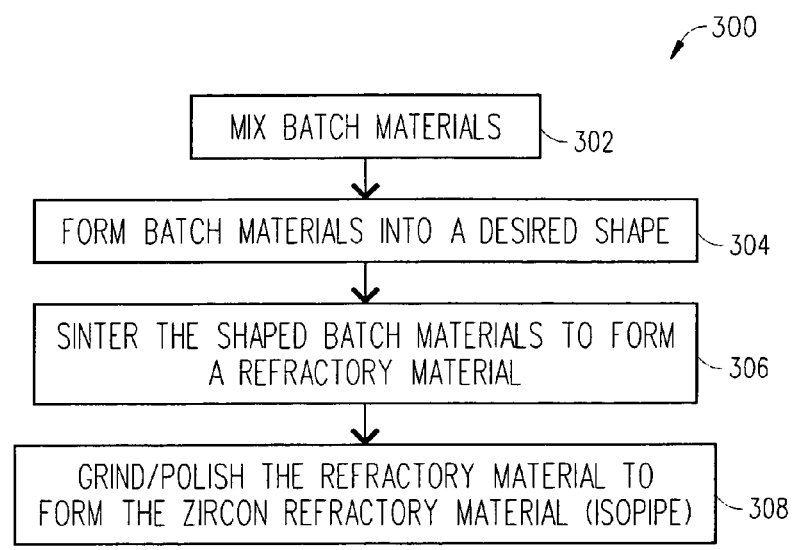
FIG. 3 is a flowchart illustrating the basic steps in a preferred method for producing the isopipe shown in FIGS. 1 and 2 in accordance with the present invention.
Figure 4:
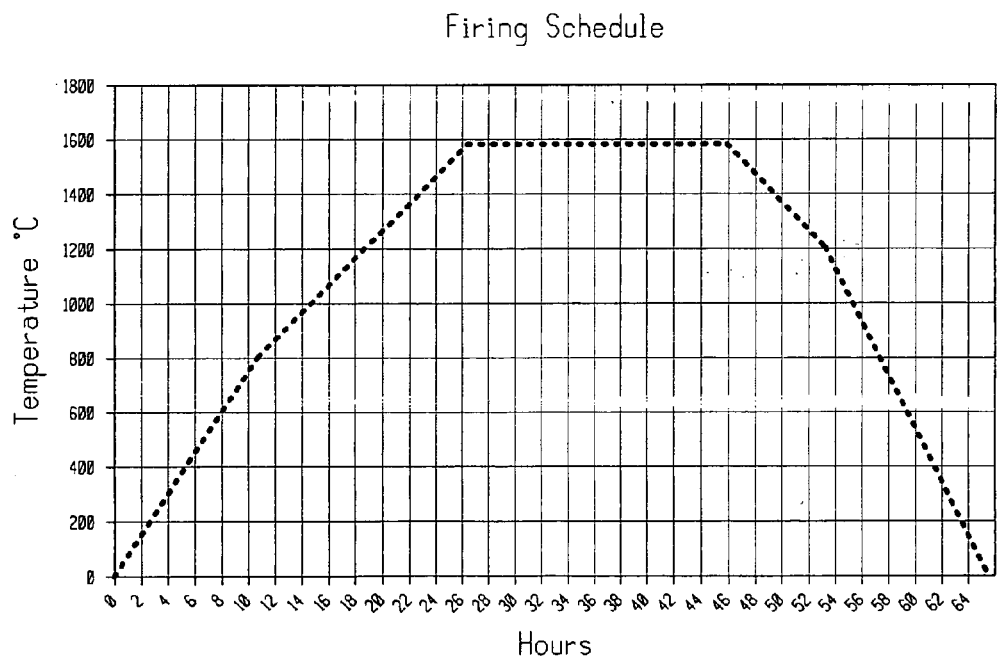
FIG. 4 is a graph illustrating a firing schedule used to make the sample zircon refractory materials listed in TABLE #3.
Figure 5A:
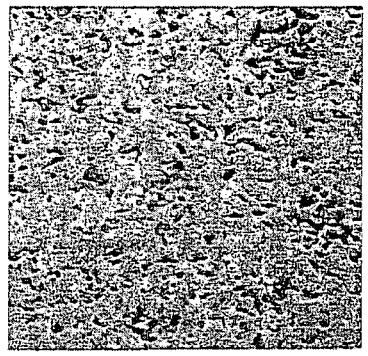
FIGS. 5A–5E are 500× SEM images of the microstructures of a traditional isopipe and sample #s 26, 30, 36 and 53 of the zircon refractory material listed in TABLE #3.
Figure 5B:
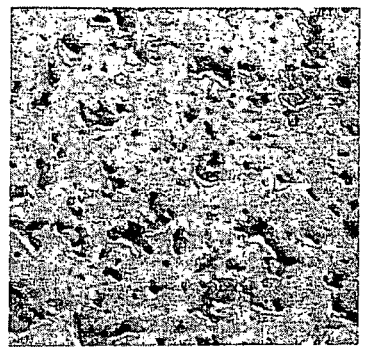
Figure 5C:
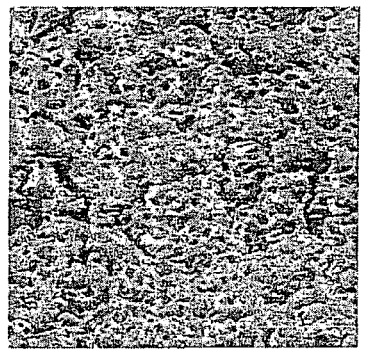
Figure 5D:
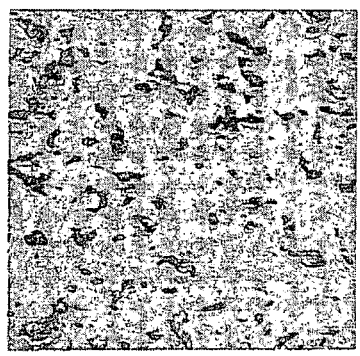
Figure 5E:
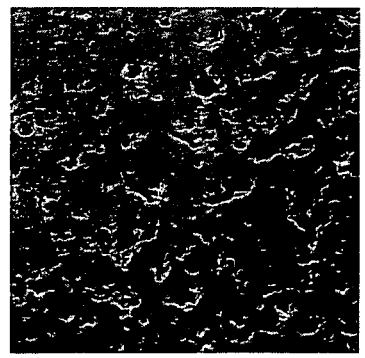

Referring to FIG. 3, there is a flowchart illustrating the basic steps in a method for producing a zircon refractory material that has the shape of the isopipe 135 in accordance with the present invention. Beginning at steps 302 and 304, the batch materials including $ZrSiO_4$, $ZrO_2$, $TiO_2$, $Fe_2O3$, a binder and a dispersant of the zircon refractory material shown in TABLES #2 and 3 are mixed and formed into a desired shape which, in the preferred embodiment, is the isopipe 135 (see FIG. 2). Then at step 306, the shaped batch material is fired/sintered in accordance with a predetermined firing schedule (see, e.g., FIG. 4) to form a refractory material. Lastly at step 308, the refractory material is ground/polished to form the zircon refractory material (e.g., isopipe 135).

The exemplary samples of zircon refractory material listed in TABLE #3 were made in a process having five steps including: (1) batching; (2) mixing; (3) spray drying; (4) isopressing; and (5) firing. Each of these steps are described in greater detail below.

Batching

All samples were initially prepared as slurries. For this experimental phase, the process included preparing small batches in Nalgene containers. The batch materials ranged from 70% to 85% oxide solids from the list in TABLE #3 with water ranging from 30% to 15%. The water was first added to the bottles followed by the oxide powders in descending order of amount. Then the organics (e.g., binder and dispersant) were added. The binder (e.g., Carbowax PEG 8000) dissolves in the batch water and the dispersant (e.g., Darvan C) aids the wetting of the powders by the water to produce a fluid mix.

Mixing

The Nalgene bottles were placed on a small roll mill and allowed to roll overnight or between 15 and 18 hours. This was necessary to insure a good homogeneous mixture of the additives with the zircon. Typically some grinding media is needed to break up any agglomerates, however, there did not appear to be a need with the powders being used in these experiments.

Spray Drying

The slurries were spray dried using a Niro Mobil Minor spray dryer. To prevent settling of the slurry solids, the slurry container was placed under a Lightnin mixer with a prop shaped blade on a shaft, which positions the prop close to the bottom of the container and the slurry was continuously mixed. The slurry was pumped to the spray dryer nozzle using a peristaltic pump. The spray nozzle was a two fluid nozzle with the slurry passing through a center feed tube and there was a concentric ring of atomizing air around the feed tube. This air broke up the slurry into small droplets, which were then dried in the chamber of the dryer using preheated incoming air. For larger batches, a larger dryer with a rotating nozzle or wheel could also be used. These dried granules settled to the bottom for collection. The basic spray drying parameters set for each sample fell in the ranges shown below in TABLE #4:

TABLE #4

| Variable | Tested Range |
| --- | --- |
| Slurry % Solids | 70% to 85% |
| Slurry feed rate | 1.0 to 2.0 (pump settings) |
| Atomizing air pressure | 1.3 to 1.8 Bar |
| Atomizing air flow | 45 to 52 cfm |
| Inlet temperature | 300° C. |
| Outlet temperature | 93 to 107° C. |

Isostatic Pressing

Before pressing, the spray-dried granules were sieved to remove any large agglomerates which may have been collected from the spray drying process. The mold set consisted of a perforated metal can that permitted fluid to flow around a rubber bag which held the granulated powder. The bag was made of Neoprene. The bag had a plug located in the open end where the mold had been filled. The plug had a spout that enabled the evacuation of air prior to isostatic pressing. To fill the bag, the can with the bag inserted therein was placed on a vibrating table and the powder was slowly and continuously poured in. When filled to the desired level, the plug was inserted, the air was evacuated with a vacuum pump and the evacuation tube was sealed off. The mold was then inserted into the isostatic press.

In this experiment, an Autoclave ATCV 30607 isostatic press was used. The mold containing the granulated powder was placed into the press chamber. After the enclosure plug of the chamber was inserted and sealed, the chamber was completely filled with water. At this point, the overflow valve was closed and the pressure was applied by a high-pressure water pump forcing liquid into the sealed chamber. This then compacted the powder inside the bag with pressure applied in all directions around the bag. A pressure of 20,000 psi was used, this point was held for one minute. After the pressure was released, the plug was withdrawn, the sample bag removed and then stripped off the compacted sample. This was then labeled for identification and shrinkage marks applied with a scribe. The sample was now ready for the firing step.

Firing

All samples were fired in a gas-fired laboratory Bickley kiln. The samples were placed on a secondary, raised hearth to give better temperature uniformity. A layer of zircon grog was placed on the hearth before setting the samples in place to seat them evenly. The firing schedule for zircon could be long or short depending on the sample size. The current samples ranged between 1" to 3" diameter and 5" to 18" long. For these sizes, the schedule shown in FIG. 4 was used with a top temperature of 1580° C. It should be appreciated that the larger pieces or samples of zircon refractory materials would require a longer firing schedule than shown in FIG. 4.

Once the samples were made, test pieces were cut from each. Some samples were then subjected to a variety of tests that measured creep rate, microstructure, firing shrinkage, Young's modulus, density and porosity (see TABLE #3 and FIGS. 8–14). For example, TABLES #5 and 6 list several properties and visual observations of the traditional zircon refractory material and sample #s 26, 30, 36 and 53.

TABLE #5*

| | Traditional Sample | Sample 30 | Sample 26 | Sample 36 | Sample 53 |
|---|---|---|---|---|---|
| Creep | 4.07E-07 | 7.84E-07 | 2.67E-07 | 2.13E-07 | 6.17E-07 |
| Microstructure | 0 | -3 | +3 | +4 | +2.5 |
| Firing Shrinkage | N/A | 6.5% | 9.25% | 8.5% | 9.5% |
| Density | 4.06 g/cc | 3.74 g/cc | 4.00 g/cc | 3.97 g/cc | 4.17 g/cc |
| Porosity | 9.8% | 18.5% | 10.1% | 12.2% | 6.9% |
| Youngs Modulus | 27.08 Mpsi | 18.97 Mpsi | 25.15 Mpsi | 25.55 Mpsi | 28.492 Mpsi |
| % $TiO_2$ | 0.30% | 0.30% | 0.30% | 0.30% | 0.40% |
| % $Fe_2O_3$ | 0.06% | 0.06% | 0.30% | 0.30% | 0.30% |
| % $ZrO_2$ | 0.00% | 0.00% | 0.00% | 0.12% | 0.03% |
| % binder | N/A | 4.00% | 4.00% | 3.00% | 3.00% |
| % dispersant | N/A | 0.09% | 0.09% | 0.09% | 0.09% |
| % Solids | 70.0% | 70.0% | 80.0% | 75.0% | 75.0% |
| 108BLF Glass** | 0.30% | 0.00% | 0.00% | 0.00% | 0.00% |

*It should be appreciated that the creep data listed in TABLE #5 is not standardized to the standard used in each test.
**108BLF is glass consisting of $SiO_2$, $Zro_2$ and $Na_2O$.

TABLE #6

(Microstructure: Visual Observation)

| Criteria | Traditional Sample | Sample 30 | Sample 26 | Sample 36 | Sample 53 |
|---|---|---|---|---|---|
| Porosity: | | | | | |
| Total | 0 | - | + | 0 | + |
| Size Range | 0 | 0 | + | + | 0 |
| Distribution | 0 | - | + | + | + |
| Interconnectivity | 0 | - | 0 | + | + |
| Sintering: | | | | | |
| Point Contacts | 0 | - | + | + | + |
| Bonding: | | | | | |
| Solid Bonding | 0 | - | + | + | + |
| Residual Granules | 0 | - | 0 | 0 | + |
| Uniformity | 0 | - | + | 0 | + |
| Gen. Overall Appearance | 0 | - | + | + | + |
| Final Rating | 0 | -3 | +4 | +3 | +2.5 |

Rating: Traditional Isopipe 0
Better: +1 to +5
Worse: -1 to -5

Referring to FIGS. 5A–5E, there are respectively shown 500×SEM images of the microstructures of the traditional isopipe and sample #s 26, 30, 36 and 53. As can be seen, sample #30 contains the same level of $TiO_2$ (0.23%) and $Fe_2O_3$ (0%) as the traditional isopipe but with an addition of unstabilized $ZrO_2$ powder it had poor properties and a high creep rate. In particular, the microstructure of sample #30 was very porous and irregular. This indicates that $ZrO_2$ without $Fe_2O_3$ inhibits densification and good bonding. And, it can also be seen that sample #s 26, 36 and 53 with 0.30% batched $Fe_2O_3$ had microstructures and properties that were better than the traditional isopipe.

A brief description is given below for each sample listed in TABLE #3 with an overall microstructure rating given at the end of the descriptions for each sample. It should be appreciated that the descriptions/evaluations provided below can be considered subjective but the given descriptions/evaluations helped the inventors to identify some of the more desirable samples.

Sample #s 1–20: Used only to develop a slurry suitable for spray drying.

Sample #21: This sample appeared uniform throughout, but very porous. The pores appeared continuous throughout which made the body look like a dense sponge. There was only a little evidence of the original spray dried granules at the low magnification. There were clusters of dense material but the bonding in general was poor with many point contacts. Rating: -3, much worse than the traditional composition.

Sample #22: This sample was not processed due to a poor slurry quality which would not spray dry.

Sample #23: This sample was very porous with a wide range of pore sizes. The pores appeared very open as expected from the porosity. The solid regions exhibited patterns of the original granules. There were dense regions, probably where the original spray dried granules were located. These were not strongly bonded together. Rating: -4, much worse than the traditional composition.

Sample #24: This sample appeared fairly dense, however, it was not very uniform. The porosity was both large and small and much of it was interconnected, showing areas of potential weakness. There was very little evidence of the original spray dried granules. There was some continuous bonding, but it was not uniform and some of it was at small contact areas rather than at large well bonded regions. This structure may exhibit good creep characteristics due to its high density, but it may not be as good as could be expected because of the bonding and the porosity distribution. Rating: -1, close to the traditional composition but bonding was not as good as it should be.

Sample #25: The uniformity was good in this sample which had a good pore distribution but it also had some clustering. Some faint remains of the original granules were seen. The bonding appeared strong throughout. The porosity appeared to be partially open and partially isolated. In general, the porosity appeared to be coarser than for the standard body but there appeared to be better continuous bonding. Rating: +1, slightly better than the standard body even with lower density and higher porosity.

Sample #26: This sample had a well distributed and uniform pore structure but the pores in general were larger than the standard body. In general, the sample appeared to have some isolated pores with few regions showing much linking or connectivity. There was some evidence of the original spray dried granules. This did not affect the good bonding between dense areas. Remaining glassy phases appeared to be in isolated pockets. In spite of the slightly larger pores and the dense areas exhibiting the original granules, this sample was uniform and well bonded. Rating: +2, better than the standard body mainly due to the more uniform pore structure and good bonding.

Sample #27: This sample had good uniform pore distribution throughout with a lot of small pores but some large pores were also present. There was some connection between larger pores, mostly along what was the original granules even though the outline of the granules was not highly pronounced. There was very little glassy phase present, probably due to the addition of zirconia in the batch which would tend to react with the silica in the glass to form more zircon. The solid areas showed good bonding throughout the body. The overall structure looked good even with a few larger pores present. Rating: +2, this body is better than the standard body with better bonding of the structure.

Sample #28: This sample exhibited a mixture of many small pores and some larger pores. The outlines of the original granules were easily seen. There were a lot of small bonds formed throughout the original granules with less in the well bonded areas. This indicated that the bulk of the porosity is open and the bonding throughout was probably poor or weak. Any glassy phase appeared to be mostly in pockets within the large dense areas. Many bonds appeared to be not much more than point contacts between zircon grains on the surfaces of adjacent granules. Rating: −2, the high density looked good but the microstructure looked poor compared to that of the standard body.

Sample #29: This sample had mixed porosity with many small pores, which may be closed, and many large ones, which, in some places were interconnected. The outline of the original spray dried granules remained with the larger pores being between these granules. The bonding within the dense areas (original granules) appeared strong with fair to good bonding between the original granules. Little glassy phase appeared to be present. Where there were many small pores, the bonds appeared to be small at point contacts. Overall, the body was not as uniform as the standard sample and may be found to be slightly worse in the creep test. Rating: −1, this body could show creep results that approach the standard body but the bonding is not as good.

Sample #30: The pore structure of this sample appeared to be very spongy. The spray dried granules were easily seen. The granules are not as dense as seen in other samples. The bonding between granules was poor in most areas. At the higher magnification, the individual grains within the granules were easily distinguished indicating poor densification. This body may not perform well in the creep test. Rating: −3, this body rates very poor as compared with the standard sample.

Sample #31: This body was used to see if the Carbowax binder could be reduced to 2% successfully. In this body there were areas of good bonding but other areas of poor bonding and extensively high porosity. In the poorly bonded areas, there appeared only to be small bonds at contact points, but with much open porosity. Generally this body is poor when compared with the standard body. Rating: −2, the pore distribution of this body was not favorable and the bonding throughout was not sufficient.

Sample #32: The porosity in this body, while high, was fairly well distributed. There are some large pores, which appeared to identify the original granule boundaries. Also, there were large areas of interconnected pores. The bonding between the dense areas tended to be small contacts but uniform. The structure was not uniform throughout, with areas of considerable fine porosity. Rating: −1, the structure of this sample was close to the standard sample but needed more uniform densification.

Sample #33: This sample exhibited porosity, some of which were larger than the pores in the standard body. The pores appeared well distributed. Some of the original spray dried granules appeared but most disappeared. The bonding between dense areas appeared good with only a few narrow contact point bonds. There were some larger pores, but they did not appear to connect or line up in the body to weaken it. The glassy phase appeared small and isolated. Rating: +1, the microstructure, in general, appeared equal to or better than the standard body.

Sample #34: This body had fairly well distributed porosity with the pore sizes slightly larger in general than for the standard body. There was an occasional large pore present. The dense part of the structure was very well bonded throughout. There remained only a small amount of visible original granule surfaces. The residual glassy phase appeared to be small and isolated. The overall bonding appeared to be better than in the standard body. Rating: +2, the better bonding suggested that this body should exhibit better creep than the standard body.

Sample #35: This sample had more porosity that was evident from the microstructure and had pores that in general were larger than pores in the standard body. It appeared to have an open pore structure but there did not seem to be any areas of pore concentration. There appeared to be a good, continuous bond throughout the body. There was only a slight residual trace of the spray dried granules. The glassy phase was minimal and well isolated. In general, there were no zones of weakness. The lower density was the only thing that may affect the creep, however, the better bonding probably compensated for this. It is believed that the lower $Fe_2O_3$ was the cause of the lower density and higher porosity. Rating: +1, this body should have better creep performance than the standard body.

Sample #36: This body was very uniform with most pores reasonably small similar to the standard body with only a few larger pores. There were little signs of spray dried particle remnants. The higher zirconia may have controlled the sintering to produce a more uniform structure. The material was very well bonded throughout. Only a small amount of glassy phase was present and it appeared isolated. This microstructure was much more uniform than the standard body. Rating: +4, this body should exhibit good creep results.

Sample #37: This body was very dense due to the higher level of $Fe_2O_3$. However, this probably created a higher level of glassy phase at high temperature thus resulting in larger pores. The pores appeared to be mostly closed and were evenly distributed. The dense areas came together and formed very well bonded areas throughout the structure. There was very little signs of the original spray dried granules. The angular structure of some of the pores appeared to be due to the original zircon grains which came into contact, bonding together, but leaving irregular pores between them. Overall, this looked like a very strongly bonded body. Rating: +3, this body should exhibit good creep properties.

Sample #38: This body had very non-uniform porosity, which was largely open porosity. The pores were generally larger than in the standard body. There were some extended/elongated pores present as well as some clustering of pores. The outlines of the original spray dried granules were very evident. The bonding was uneven with dense areas, which showed rather poor bonding to adjacent material. The glassy phase was limited due to the $ZrO_2$ addition and was located in pockets within the dense regions. In general, due to the high porosity, its distribution and the weak bonding throughout, this was a poor body, which will probably not be good for creep resistance. Rating: −2, not a good candidate composition.

Sample #39: This body had a high porosity with non-uniform distribution and large pores. Much of it was interconnected such that it would probably affect the creep adversely. Because of the pore distribution, it was difficult to pick out many of the remains of the original spray dried granules. The bonding was poor with very little well bonded areas present. It appeared that the higher level of $ZrO_2$ may have inhibited bond growth. There were a few bright spots present, which were probably residual zircon which did not tract with the silica in the glassy phase. Remaining glassy material appeared as small isolated pockets in densified areas. Rating: −3, this body would probably exhibit high creep results.

Sample #40: This sample had a high porosity, which was non-uniformly distributed, and some pores were rather large.

There was considerable sintering and bond formation in the dense areas but interconnected pores appeared to disrupt good continuous bonding. The remnants of original spray dried granules were mostly gone or masked by the pore distribution. Little glass remained but what remained appeared to be in isolated pockets. Rating: −2, this body is not a good candidate.

Sample #41: This sample had a very high porosity. The pores were larger than in the standard body and were interconnected extensively as would be expected with such a low density. There was densification, but in isolated areas. These areas were not well bonded to their neighbors. The glassy phase appeared in grain boundaries and there appeared to be more of it. This body would probably show high creep levels. Rating: −3, the creep rate of this body would be way too high to be a candidate.

Samples #41-G1 thru #41-G5: These sample can all be described the same as #41. The presence of the grog was not evident after firing in any of these samples. Rating: −3.

Sample #41-L: This body is from batch #41 but was a much larger sample than #41 sample. Its composition was almost identical to the standard. It was very porous with a wide range of pore sizes that were very non-uniform throughout. There were pore clusters and strings, which could weaken the structure. Some of the original spray dried granules were visible. The bonding did not appear to be well developed and continuous. Many bonds were not much more than small contacts between grains. There was a glassy phase but it was primarily isolated. The pore structure was very open throughout the body. Rating: −2, this sample was much worse than the standard body and would probably perform very poor in the creep test.

Sample #42-L: This sample had good density and porosity. The pores were slightly larger than in the standard body, but were evenly distributed. The bonding was a mixture of some contact points and larger bonds between dense areas. There did not appear to be any large areas of high porosity, which could affect the bond strength. A small amount of glass was present, but it was in isolated pockets. The original spray dried granules were no longer obvious in this body. The overall structure looks slightly better than the standard. Rating: +1.5, this sample looks promising and will probably perform well in the creep test.

Sample #43-L: This sample had a density greater than the standard sample and yet had a higher porosity. The pores were larger in size and this higher porosity for its density indicates that they where well connected while the standard sample with smaller pores probably had many closed pores which were not seen in the porosity test. The dense areas of this body were well developed and well bonded together. While there was an occasional large pore, the pores were not connected in a manner to create weak areas. The original spray dried granules were not obvious in the fired material. There was a small amount of glass, but it was isolated in pockets and not in grain boundaries. Rating: +3, while the porosity size was larger and the pores highly interconnected, the good bonds throughout should give this sample good creep results.

Sample #44: This sample had a good density with uniform pore size and distribution. There were a few larger pores but it did not contain much in clustering of pores. The bonds appeared to be strong with only a few weaker point contact bonds. Any glassy phase appeared well isolated. Rating: +2.5, with the good density and porosity along with good bonding, this body should exhibit better creep than the standard body.

Sample #45: This sample had a well distributed porosity but with some pore clusters but not large ones. There did not appear to be any large pores. The bonding appeared good with a few areas showing less bonding due to some point contact bonds. There was nothing which suggested large weakened areas. There may be a glassy phase which was high in Si. Overall the structure looked about the same as the standard but with a higher density. Rating: +1, the body should have about the same creep as the standard body.

Sample #46: This sample had good density and most of the porosity was well distributed. There were a few larger pores but they were distributed and not clustered. The bonding was good throughout with mostly solid bonds and a few point contacts. The glassy phase was isolated. There was almost no indication of the original granules. Rating: +2.5, good density, good bonding, should perform well.

Sample #47: This sample exhibited a dark core and was lighter near the surface. Since this was similar to sample #37A and both had 0.60% $Fe_2O_3$, it was probably due to the reduction on the iron in the sample. Both light and dark areas had uniform pore distribution and no pore clustering. The bonding appeared strong with only a few small contact point bonds. Because the samples were not polished well, it was hard to evaluate the glassy material. However, from the EDX, it appeared that it is minimal. With its high density, good bonding and also a high E-Modulus, this appeared to be a good sample. Both light and dark areas appeared the same. Rating: +3, this sample should perform well in the creep test. Sample #48L: This sample had the highest density seen to this point. The pores were small and, from the measured porosity, mostly isolated. This sample was pressed as the larger cylindrical size. It also contained 0.60% Fe2O3. As a result the outer portion was a light buff or tan due to the iron while the center was dark. This indicated that the iron and probably the titania were partially reduced during firing and, because of lack of an open pore structure, were not easily re-oxidized on cooling. However, the microstructure was well bonded in both areas. There appeared to be small pockets of glassy phase that were well isolated such that should not affect creep. A slower firing schedule, which is kept well oxidizing, should help lighten the dark interior. Discounting the reduced center, the microstructure appeared well developed. Rating: +3.5, this sample is much better than the standard. It should yield good creep results.

Sample #35-A: This sample appeared fairly uniform in porosity size and distribution with only an occasional large pore. The structure was very well bonded with a minimum of small contact bonds. The porosity was lower than in the early sample #35 even though both were pressed from the same batch of spray dried granules. One difference between these two is the use of a vibrating table to help develop a more uniform packing when the mold was filled. The residual appearance of the original spray granules was nearly absent. There was little glassy phase present and it was isolated. Rating: +3, this body should have a better creep performance than sample #35 and the standard sample.

Sample #37-A: This sample was one of the densest samples made to this point. It had very low porosity, which was mostly fine and uniformly distributed. The bonding throughout consisted of well-bonded areas with very few point contact bonds. There were no areas of excessive pore clusters. One feature which was different from earlier samples is that the color in the center was darker as compared to the material close to the surface. This could have been due to incomplete binder burnout, due to the denser compaction of the powders or due to being slightly reduced with the lower porosity not allowing re-oxidation as the material cooled from the top firing temperature. To correct this, a slower firing schedule could be used to allow time for binder burnout and re-oxidation on cooling from the top temperature. This should not affect the performance. There was very little glassy phase which was located in isolated pockets. Rating: +4.5, this sample had the best microstructure and bonding seen thus far. With its density and also high E-Modulus, this sample should exhibit a very low creep rate.

Sample #40A: This sample was very porous with the pore structure open throughout but uniform. There was some good bonding but, with the high porosity, there were extensive weak point contact bonds. The microstructure looked spongy. There was considerable signs of the original spray dried granules evident. There was some glass phase where granules meet which appeared to have prevented good bond formation. Rating: −1, the microstructure of this sample, while not considered very good, the continuous, uniform bonding might yield a creep close to the standard.

Sample #43A: This sample had a density equal to the standard but less than the large sample #43L. The pores were larger than in the standard and there was considerable clustering. The bonding was good in areas but they were smaller in some areas. The non-uniform pore structure resulted in weak bonding where there are pore clusters. The indication appeared that a larger isopressing gave more uniform structure after firing than a smaller pressing. Rating: +2, this body could exhibit better creep results than the standard but probably not as good as sample #43L.

Sample #49: This sample had pores less evenly distributed. There was some clustering. The bonding did not appear as strong as in some other bodies even though it continuous. The bonding areas were smaller. Even so, it appeared better boded than the standard sample. Many areas had considerable point contact bonds. Rating: +1, has the potential to be equivalent to the standard sample.

Sample #50: This sample appeared to be good from the pore distribution. It was uniform throughout with no large pores but some size differences. Also, there appeared to be considerable glass. It was mostly isolated in pockets throughout the structure but may have hurt the densification process. Many point contact bonds were evident. Rating: +1, good uniform microstructure but probably only equivalent or slightly better than the standard sample.

Sample #51: This sample exhibited uniform pore distribution with little clustering of limited size. No large pores were seen. The bonding appeared very strong with almost no point contact bonds. While the pores were slightly larger than the standard sample, they were not as interconnected in clusters. Any glass was isolated. Rating: +2.5, should perform better than the standard sample.

Sample #52: This sample had a very uniform structure. The pores were slightly larger than in the standard sample. They showed no clustering leading to weak areas. The bonds were well formed with few point contacts. There appeared a little glassy phase but it was in isolated areas and did not affect the structure. Rating: +3.5, the general structure is better than the standard sample and should perform well in creep.

Sample #53: The porosity was well distributed. Some slightly larger pores were seen. There were local clusters but few and small. The bonding was very good. There were only a few point contact bonds. The glassy phase was high in Ti and Fe in this sample which is probably a sign that the amount present is very small. Otherwise the glass appeared in small isolated areas. Rating: +2.5, this sample looks better than the standard sample. The creep test was run and shows 6.17E-7 for this sample as compared to 14.04E-7 for the standard sample or less than half that of the standard sample.

Samples #54 and #55: Slurries were not successful and these batches were not processed further.

Sample #56: This sample had a uniform pore distribution. The bonding, in general, was not as strong. It appeared that the higher $ZrO_2$ reduced the bonding or the lower $TiO_2$ was not sufficient for good densification or a combination of the two. The bonding was somewhat irregular from area to area. Still, the creep rate was only 6.47E-7 or about half of the standard sample. Rating: +1, this sample is better than the standard sample.

Scaled-up large block results (not shown in TABLE #3):

Sample #53-SU1-T: This sample was cut from the large scale-up block from the block end that represents the top of the mold as it was being filled with granules and vibrated. The microstructure of this body was very uniform with no areas of weakness such as pore clusters or strings of pores. The pore size was small and uniform and the pores were well distributed and isolated from one another. This is the reason for such a small measured porosity while the calculated porosity is about 7.9%. The small amount of glassy phase was well isolated in pockets and not throughout the grain boundaries. The bonding was continuous and appeared excellent. This resulted in a high E-modulus. Rating: +4.5, this sample had a microstructure much better than the standard sample. With its density and E-modulus, it should perform much better than the standard sample in the creep test.

Sample #53-SU-1-B: This sample, taken from the bottom of the block as orientated as the mold was being filled, had essentially the same microstructure and properties as sample SU1-T. There were two small differences. The first was more related to the quality of the polished section making the surface appear not to be uniformly flat. The second was that the pores were slightly less uniform. The bonding still appeared excellent and the glassy phase was isolated. Rating: +4.5, while appearing slightly different, this part of the large block should be similar to the sample from the top of the block.

Referring to FIGS. 6–13, there are illustrated several graphs that show details about the creep rates of different zircon refractory materials made in accordance with the traditional zircon refractory material and/or selected samples of the zircon refractory material listed in TABLE #3.

Figure 6:
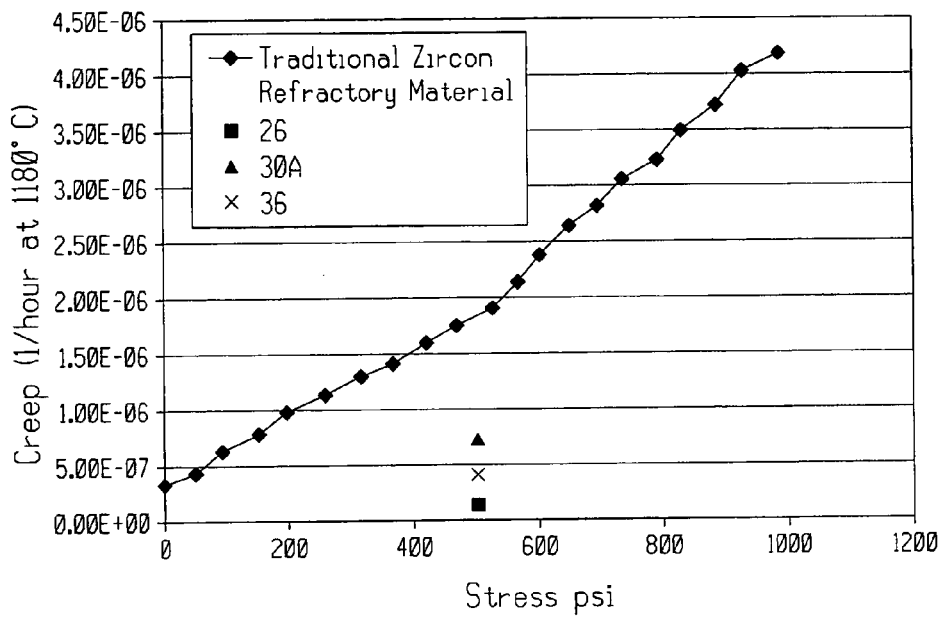
FIG. 6 is a graph that compares creep rate (1/hour) vs. stress (psi) between the traditional zircon refractory material and sample #s 26, 30A and 36 of the zircon refractory material listed in TABLE #3.

Referring to FIG. 6, there is illustrated a graph comparing creep rate (1/hour) vs. stress (psi) between the traditional zircon refractory material and sample #s 26, 30A and 36 of the zircon refractory material listed in TABLE #3.

Figure 7:
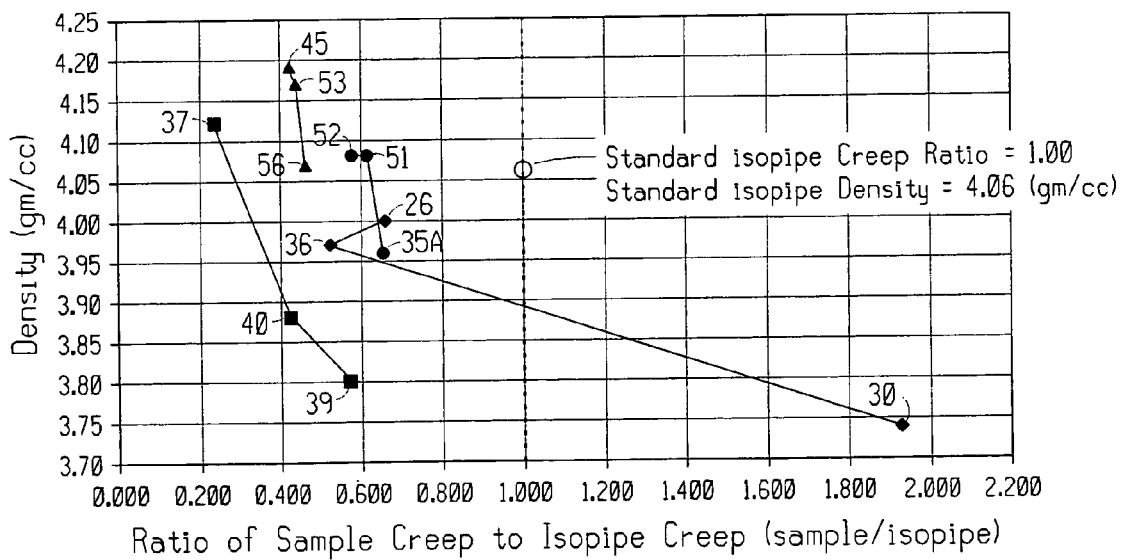
FIG. 7 is a graph that compares density (gm/cc) vs. creep ratio between the traditional zircon refractory material and sample #s 26, 30, 36, 37, 39, 40, 35A, 51, 52, 45,53 and 56 of the zircon refractory material listed in TABLE #3.

Referring to FIG. 7, there is illustrated a graph comparing density (gm/cc) vs. creep ratio between the traditional zircon refractory material and various samples of the zircon refractory material listed in TABLE #3. It should be appreciated that each group of three samples shown that are connected by one line is one test run. And, each test run also had a 4th sample that was the traditional sample which was used as a reference point. For each of the four tests shown the creep rates for each sample is standardized to the creep of the standard sample in the test.

Figure 8:
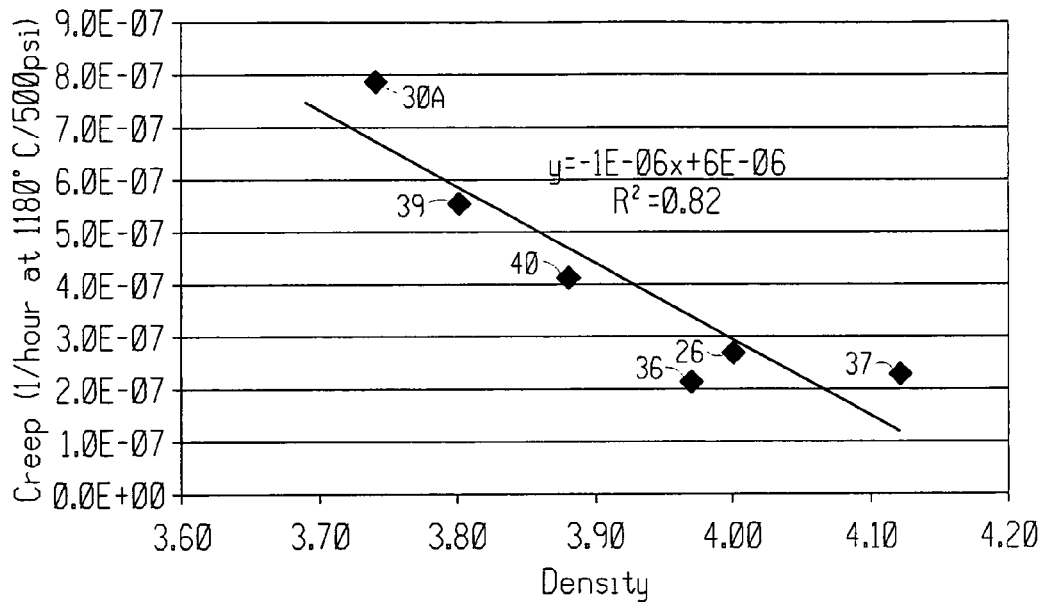
FIG. 8 is a graph that compares creep rate (1/hr) vs. density of sample #s 26, 30A, 36, 37, 39 and 40 of the zircon refractory material listed in TABLE #3.

Referring to FIG. 8, there is a graph illustrating the creep rate (1/hr) vs. density of sample #s 26, 30A, 36, 37, 39 and 40 of the zircon refractory material listed in TABLE #3. As can be seen, the creep rate decreased as the density increased. The data exhibited a good correlation with the density.

Figure 9:
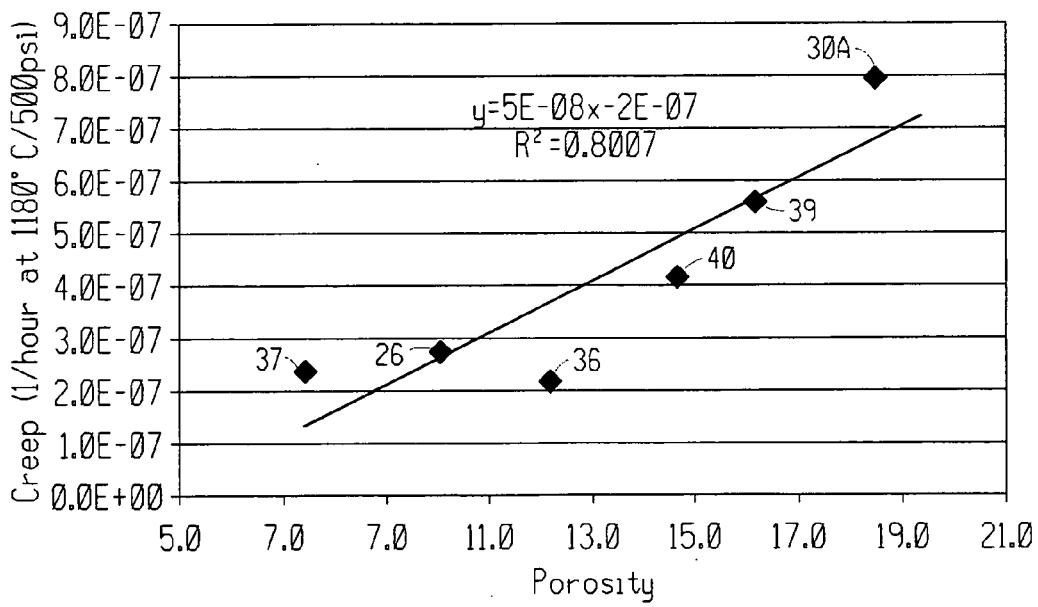
FIG. 9 is a graph that compares creep rate (1/hr) vs. porosity of sample #s 26, 30A, 36, 37, 39 and 40 of the zircon refractory material listed in TABLE #3.

Referring to FIG. 9, there is a graph illustrating the creep rate (1/hr) vs. porosity of sample #s 26, 30A, 36, 37, 39 and 40 of the zircon refractory material listed in TABLE #3. As can be seen, the correlation between creep rate and porosity was also good which was expected because porosity is related to density. This trend to improve creep supports the trend seen above in FIG. 8.

Figure 10:
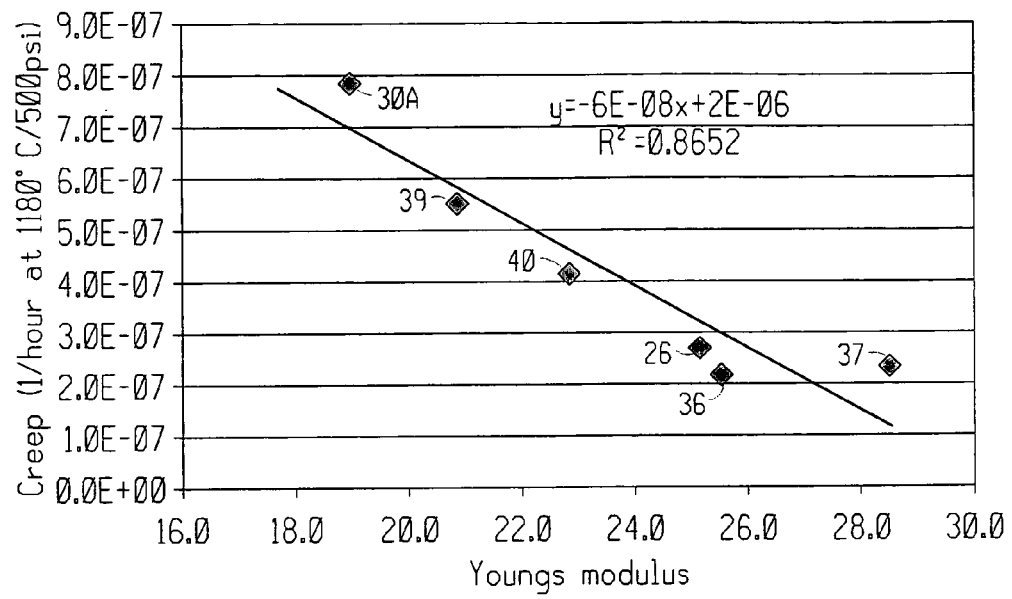
FIG. 10 is a graph that compares creep rate (1/hr) vs. youngs-modulus of sample #s 26, 30A, 36, 37, 39 and 40 of the zircon refractory material listed in TABLE #3.

Referring to FIG. 10, there is a graph illustrating the creep rate (1/hr) vs. youngs modulus of sample #s 26, 30A, 36, 37, 39 and 40 of the zircon refractory material listed in TABLE #3. As can be seen, the creep performance improved with an increasing youngs modulus. This was expected since the youngs modulus is strongly dependent on density.

Figure 11:
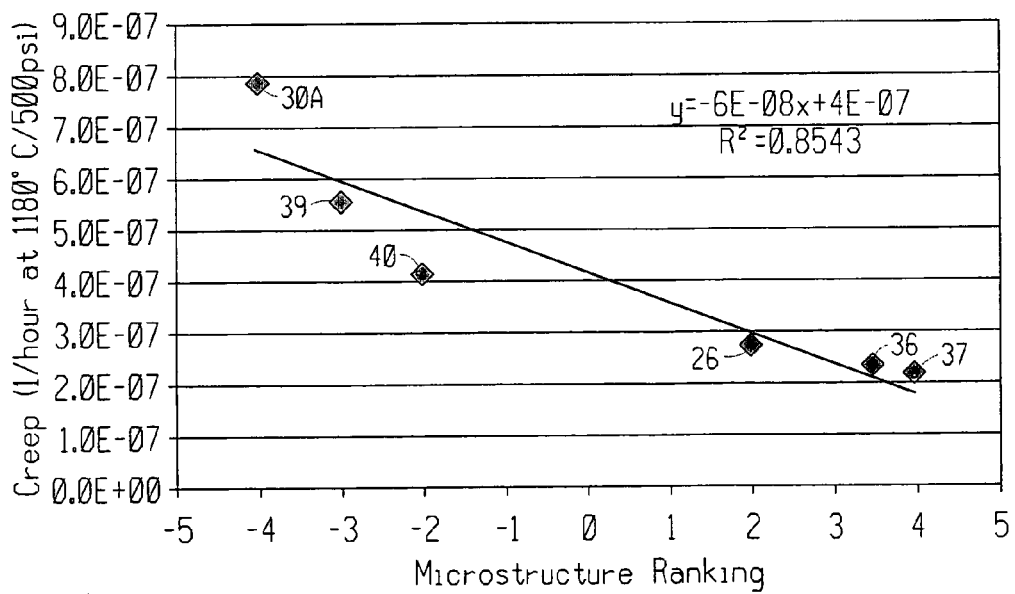
FIG. 11 is a graph that compares creep rate (1/hr) vs. microstructure ratings of sample #s 26, 30A, 36, 37, 39 and 40 of the zircon refractory material listed in TABLE #3.

Referring to FIG. 11, there is a graph illustrating the creep rate (1/hr) vs. microstructure ratings of sample #s 26, 30A, 36, 37, 39 and 40 of the zircon refractory material listed in TABLE #3. Again, the trend of improving creep performance followed closely to the previous three graphs of FIGS. 8–10.

As can be seen in FIGS. 8–11, the sample #s 30A, 39 and 40 with no $Fe_2O_3$ have the highest creep rates. They show decreasing rates as the $TiO_2$ is increased from 0.23% to 0.30% and then 0.40%. The other sample #s 26, 36 and 37 with low creep rates have either 0.30% or 0.60% $Fe_2O_3$. The lowest creep sample #36 had 0.30% iron but also had the highest $ZrO_2$ a 0.12%. While the $ZrO_2$ did not appear to drive density, it appeared to have an effect on the sintering mechanism which affected the bonding.

Figure 12:
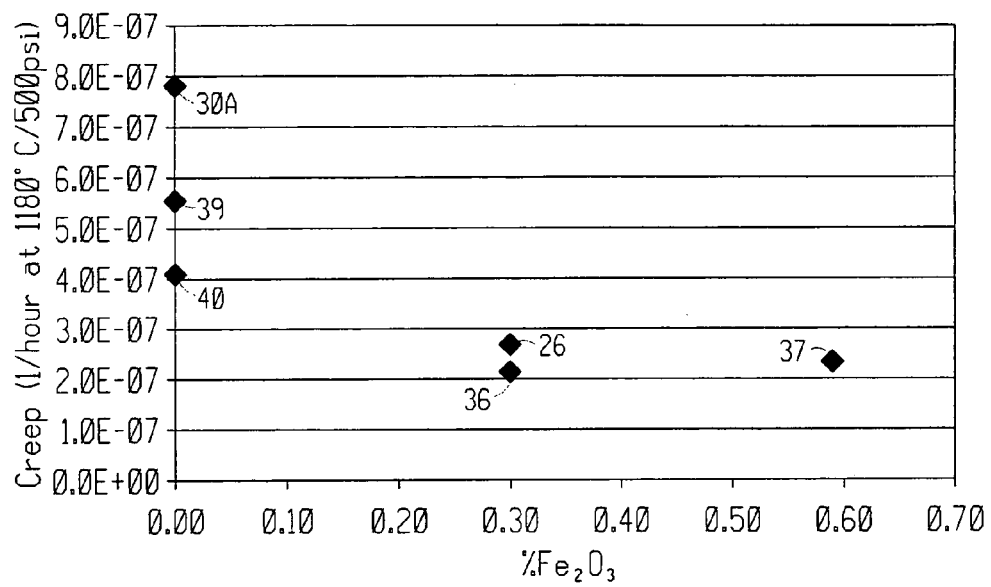
FIG. 12 is a graph that compares creep rate (1/hr) vs. % $Fe_2O_3$ additive of sample #s 26, 30A, 36, 37, 39 and 40 of the zircon refractory material listed in TABLE #3.

Referring to FIG. 12, there is a graph illustrating the creep rate (1/hr) vs. % $Fe_2O_3$ additive of sample #s 26, 30A, 36, 37, 39 and 40 of the zircon refractory material listed in TABLE #3. In this graph, the three sample #s 30A, 39 and 40 on the left with the higher creep rates all had zero iron but had from 0.23% to 0.30% to 0.40% $TiO_2$ added. The addition of more $TiO_2$ lowered the creep rate. The sample #s 26, 36 and 37 with 0.30% and 0.60% $Fe_2O_3$ were all close in creep. The $TiO_2$ is constant in sample #s 26, 36, and 37. The best sample #36 with the lowest creep rate had 0.30% $Fe_2O_3$ but also had higher $ZrO_2$ which may have over shadowed the higher iron in sample #37 which had a slightly higher creep. This could have been due to an interaction of these additives that affected both microstructure and creep.

Figure 13:
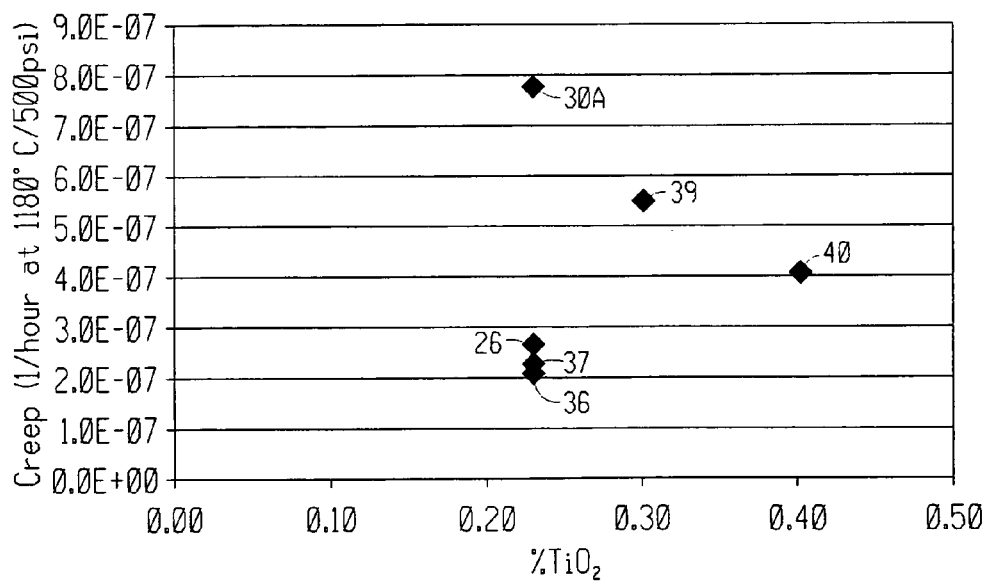
FIG. 13 is a graph that compares creep rate (1/hr) vs. % $TiO_2$ additive sample #s 26, 30A, 36, 37, 39 and 40 of the zircon refractory material listed in TABLE #3.

Referring to FIG. 13, there is a graph illustrating the creep rate (1/hr) vs. % $TiO_2$ additive of sample #s 26, 30A, 36, 37, 39 and 40 of the zircon refractory material listed in TABLE #3. Here, the sample #s 30A, 39 and 40 with highest creep rates showed the effect of the $TiO_2$. These three samples had no iron. Again, the best three sample #s 26, 36, and 37 for creep all had the same amount of $TiO_2$. The middle sample #37 of these three had the higher iron but it did not drive the creep rate. These three samples showed very little difference and the results here may be within experimental error.

Figure 14:
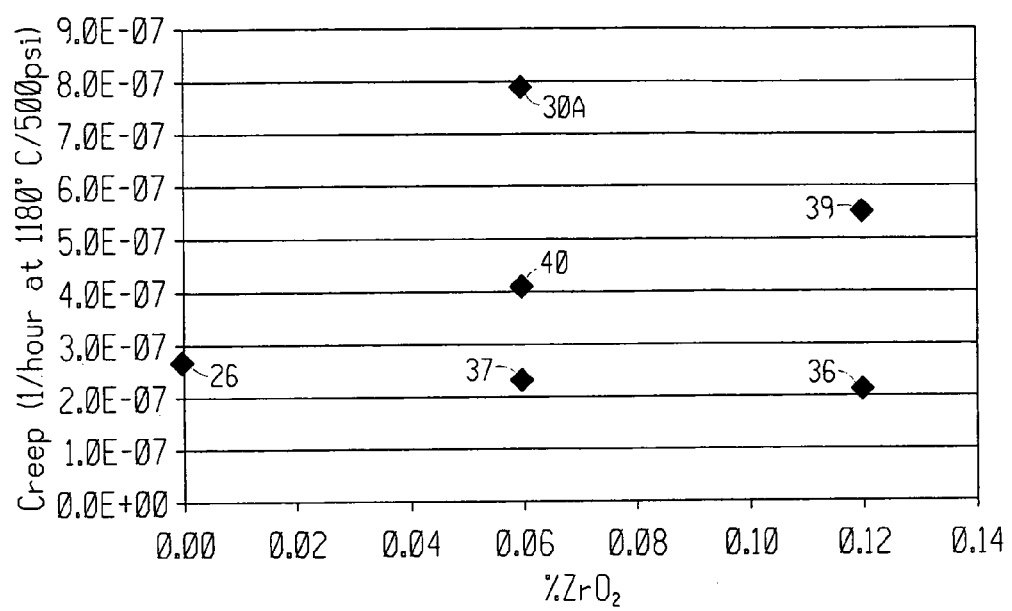
FIG. 14 is a graph that compares creep rate (1/hr) vs. % $ZrO_2$ additive of sample #s 26, 30A, 36, 37, 39 and 40 of the zircon refractory material listed in TABLE #3.

Referring to FIG. 14, there is a graph illustrating the creep rate (1/hr) vs. % $ZrO_2$ additive of various samples of the improved zircon refractory material listed in TABLE #3. There appeared to be no major trend. However, the sample #36 with the highest $ZrO_2$ level gave the best measured result. It is suspected that the $ZrO_2$ may have influenced the sintering mechanism. This will be discussed below.

Some general observations shown in FIGS. 8–11 followed what was expected. Both $TiO_2$ and $Fe_2O_3$ were good mineralizers that enhanced reaction and sintering during firing. By far, the $Fe_2O_3$ had more impact on creep rate than the $TiO_2$. The $ZrO_2$ appeared to play a little role in increasing the density or the E-modulus of the fired zircon refractory material. When the $ZrO_2$ was increased, with other additions constant, the density of the zircon refractory material often decreased.

Iron plus zirconia appeared to have an interaction such that with the two, the density can be lowered and still have good bonding which can decrease the creep rate. It is believed that this happened because the reaction path may have been altered during firing such that the bonds are stronger. Also, the free $ZrO_2$, as batched, probably reacted during firing with any free silica, thus reducing any residual glass while at the same time; this newly formed zircon could have been enhancing the bonds. In addition, the presence of the free $ZrO_2$ may have reduced the tendency of dissociation of the zircon from the zircon refractory material which starts to take place as the firing temperature approaches 1600° C.

The effect of the zirconia-iron reaction can be demonstrated in TABLE #7.

TABLE #7

| Sample # | $Fe_2O_3/ZrO_2$ | Density | E-modulus | Microstruct. | Creep Rate |
|---|---|---|---|---|---|
| 26 | 0.30/0.06 | 4.00 | 25.1 | +2 | 2.67E−7 |
| 36 | 0.30/0.12 | 3.97 | 25.5 | +4 | 2.13E−7 |
| 37 | 0.60/0.06 | 4.12 | 28.5 | +3.5 | 2.30E−7 |

From this table, one would expect from the density and e-modulus values, sample #37 should have the lowest creep rate. However, sample #36 had the lower value. It is believed the 0.12% $ZrO_2$ had a bonding effect with the lower iron, 0.30% $Fe_2O_3$. The microstructure also appeared to be slightly better in sample #36 and in the graph of creep vs. microstructure shown in FIG. 11, they did correlate. It should be appreciated that not all of the samples in TABLE #3 have been considered in FIGS. 8–11.

Following are some features, advantages and uses of the zircon refractory material of the present invention:

The new composition of the zircon refractory material lowers the creep rate of an isopipe which means that the new isopipe can last much longer than the traditional isopipe which reduces lost production time that can result in great cost savings.

It is believed that a wider glass sheet is likely to be manufactured in the future which means that longer isopipes will be needed. Therefore, it is even more essential to reduce the creep rate of the isopipe as demonstrated with the present invention.

The zircon refractory material of the present invention could also be used to make other components of the glass manufacturing system.

The preferred glass sheets made using the zircon refractory material are aluminosilicate glass sheets or borosilicate glass sheets.

The preferred process for manufacturing the glass sheets using an isopipe made from the zircon refractory material is the downdraw sheet manufacturing process. As used herein, the downdraw sheet manufacturing process refers to any form of glass sheet manufacturing process in which glass sheets are formed while traveling in a downward direction. Other forms of downdraw sheet forming techniques include the slot draw and redraw forming techniques.

The present invention is particularly useful for forming high melting or high strain point glass sheets like the ones used in flat panel displays. Moreover, the present invention could be beneficial in the manufacturing of non-LCD glass.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A zircon refractory material having a composition including the following elements:
    $ZrSiO_4$ (98.75–99.68 wt %)
    $ZrO_2$ (0.01–0.15 wt %)
    $TiO_2$ (0.23–0.50 wt %)
    $Fe_2O_3$ (0.08–0.60 wt %).

2. The zircon refractory material of claim 1, wherein said $ZrSiO_4$ includes a known amount of $TiO_2$ and $Fe_2O_3$ not counting said $TiO_2$(0.23–0.50 wt %) and $Fe_2O_3$ (0.08–0.60 wt %).

3. The zircon refractory material of claim 1, wherein a binder and a dispersant were added to batch materials including $ZrSiO_4$, $ZrO_2$, $TiO_2$ and $Fe_2O_3$ all of which are used to make said zircon refractory material wherein said binder and said dispersant were burned out during a sintering process to form said zircon refractory material.

4. The zircon refractory material of claim 3, wherein said binder (2.00–4.00%) is polyethylene glycol.

5. The zircon refractory material of claim 3, wherein said dispersant (0.06–0.25%) is polyelectrolyte.

6. The zircon refractory material of claim 3, wherein said dispersant (0.06–0.25%) is ammonium polymethacrylate and water.

7. The zircon refractory material of claim 1, wherein said zircon refractory material has the following composition:
    $ZrSiO_4$ (98.75–99.65 wt %)
    $ZrO_2$ (0.02–0.15 wt %)
    $TiO_2$(0.23–0.50 wt %)
    $Fe_2O_3$ (0.10–0.60 wt %).

8. The zircon refractory material of claim 1, wherein said zircon refractory material has the following composition:
    $ZrSiO_4$ (98.95–99.55 wt %)
    $ZrO_2$(0.03–0.15 wt %)
    $TiO_2$(0.30–0.45 wt %)
    $Fe_2O_3$ (0.12–0.45 wt %).

9. The zircon refractory material of claim 1, wherein the zircon refractory material is used in a glass manufacturing system.

10. A method for producing a zircon refractory material, said method comprising the steps of:
    mixing a plurality of batch materials including:
        $ZrSiO_4$ (by difference)
        $ZrO_2$(0.01–0.15 wt %)
        $TiO_2$(0.23–0.50 wt %)
        $Fe_2O_3$ (0.08–0.60 wt %);
    forming into a shape the mixed batch materials; and
    firing the shaped mixed batch materials to form said zircon refractory material.

11. The method of claim 10, wherein said step of forming includes:
    spray drying the mixed batch materials; and
    pressing the spray dryed batch materials to form the shaped mixed batch materials.

12. The method of claim 10, wherein said $ZrSiO_4$ includes a known amount of $TiO_2$ and $Fe_2O_3$ not counting said batched $TiO_2$ (0.23–0.50 wt %) and $Fe_2O_3$ (0.08–0.60 wt %).

13. The method of claim 10, wherein a binder and a dispersant were added to batch materials including $ZrSiO_4$, $ZrO_2$, $TiO_2$ and $Fe_2O_3$ all of which are used to make said zircon refractory material wherein said binder and said dispersant were burned out during a sintering process to form said zircon refractory material.

14. The method of claim 13, wherein said binder (2.00–4.00%) is polyethylene glycol.

15. The method of claim 13, wherein said dispersant (0.06–0.25%) is polyelectrolyte.

16. The method of claim 13, wherein said dispersant (0.06–0.25%) is ammonium polymethacrylate and water.

17. The method of claim 10, wherein said zircon refractory material has the following composition:
    $ZrSiO_4$ (by difference)
    $ZrO_2$ (0.02–0.15 wt %)
    $TiO_2$ (0.23–0.50 wt %)
    $Fe_2O_3$ (0.10–0.60 wt %).

18. The method of claim 10, wherein said zircon refractory material has the following composition:
    $ZrSiO_4$ (by difference)
    $Zro_2$(0.03–0.15 wt %)
    $TiO_2$(0.30–0.45 wt %)
    $Fe_2O_3$ (0.12–0.45 wt %).

19. The method of claim 10, wherein the zircon refractory material is used in a glass manufacturing system.

20. A glass manufacturing system comprising:
    at least one vessel for melting batch materials; and
    a forming vessel for receiving the melted batch materials and forming a glass sheet, wherein at least a portion of said forming vessel is made from a zircon refractory material having a composition including the following elements:
        $ZrSiO_4$ (by difference)
        $ZrO_2$(0.01–0.15 wt %)
        $TiO_2$(0.23–0.50 wt %)
        $Fe_2O_3$ (0.08–0.60 wt %).

21. The glass manufacturing system of claim 20, wherein said at least one vessel includes a melting, fining, mixing or delivery vessel.

22. The glass manufacturing system of claim 20, wherein said $ZrSiO_4$ includes a known amount of $TiO_2$ and $Fe_2O_3$ not counting said batched $TiO_2$ (0.23–0.50 wt %) and $Fe_2O_3$ (0.08–0.60 wt %).

23. The glass manufacturing system of claim 20, wherein a binder and a dispersant were added to batch materials including $ZrSiO_4$, $ZrO_2$, $TiO_2$ and $Fe_2O_3$ all of which are used to make said zircon refractory material wherein said binder and said dispersant were burned out during a sintering process to form said zircon refractory material.

24. The glass manufacturing system of claim 23, wherein said binder is polyethylene glycol.

25. The glass manufacturing system of claim 23, wherein said dispersant is polyelectrolyte.

26. The glass manufacturing system of claim 23, wherein said dispersant is ammonium polymethacrylate and water.

27. The glass manufacturing system of claim 20, wherein said zircon refractory material has the following composition:
    $ZrSiO_4$ (by difference)
    $ZrO_2$(0.02–0.15 wt %)
    $TiO_2$(0.23–0.50 wt %)
    $Fe_2O_3$ (0.10–0.60 wt %).

28. The glass manufacturing system of claim 20, wherein said zircon refractory material has the following composition:
    $ZrSiO_4$ (by difference)
    $Zro_2$ (0.03–0.15 wt %)
    $TiO_2$ (0.30–0.45 wt %)
    $Fe_2O_3$ (0.12–0.45 wt %).

* * * * *